H. A. R. HORTON & A. P. HAYES.
Tire-Tightener.

No. 166,105.   Patented July 27, 1875.

WITNESSES:

INVENTOR:
H. A. R. Horton and
A. P. Hayes
BY
ATTORNEYS.

UNITED STATES PATENT OFFICE.

HENRY A. R. HORTON AND AMOS P. HAYES, OF McKINNEY, TEXAS, ASSIGNORS OF ONE-HALF THEIR RIGHT TO JOHN H. OWEN.

IMPROVEMENT IN TIRE-TIGHTENERS.

Specification forming part of Letters Patent No. 166,105, dated July 27, 1875; application filed April 17, 1875.

*To all whom it may concern:*

Be it known that we, HENRY A. R. HORTON and AMOS P. HAYES, of McKinney, in the county of Collins and State of Texas, have invented a new and Improved Tire-Tightener, of which the following is a specification:

This invention is designed for the purpose of tightening or loosening tires on wheels belonging to any kind of vehicles without shrinking or cutting the tires.

The joint is composed of two nuts connected together by a bolt with right and left threads. In the middle or center of the bolt there is an enlarged place of octagon shape, which answers as its center-head and the bolt is screwed into the nuts by use of any wrench that will fit an octagon head. The nuts are welded near the ends of the tire to it, the distance varying according to the size of the wheel upon which they are to be used. The bolt should be long enough to extend through each nut about one-half inch when screwed entirely up, and fit into holes made in the ends of the fellies. In one end of the tire a tongue is to be cut one-third the width of the tire, and in the other end of the tire a slot is to be cut into which this tongue fits with a perfect miter. The corners of the tongue should be clipped, and the slot into which it fits should be so shaped as to make an exact fit. The miter-joint is intended to prevent the ends of the tire from springing apart laterally. The joint is covered underneath by a clip made so as to fit up to the edges of the tire. This also has a miter, and is intended to protect and strengthen the joint. The clip is held to its place by means of square bolts passing through slotted holes in each end of the clip and fellies. The ends of the fellies are cut into blunt wedge shape, and covered by thimbles, either cast or wrought out of any malleable iron, and the nuts are so shaped that the thimbles fit into them exactly. The ends of the nuts nearest the center-head on the bolt are square.

Figure 1:
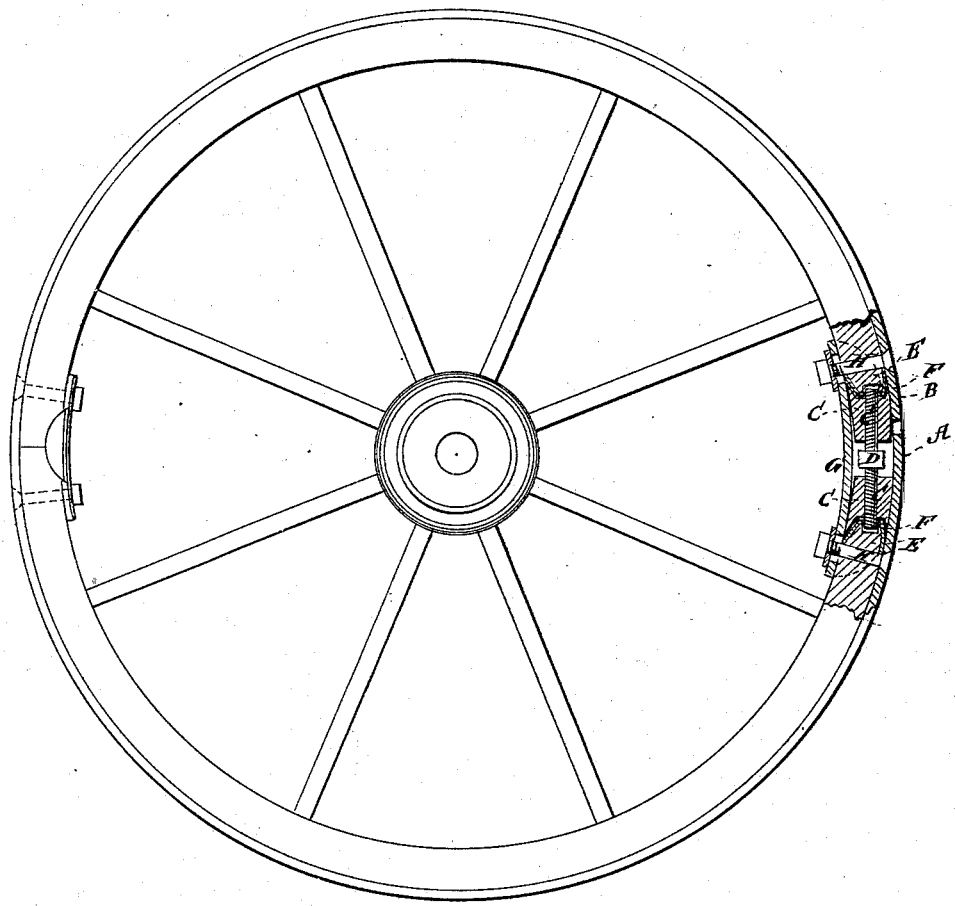
Figure 2:
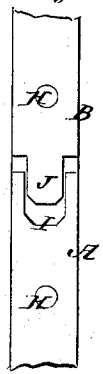

Figure 1 is a section of my improved tire-tightening device, taken on the plane of the wheel; and Fig. 2 is a plan of the face, showing the joint of the ends of the tire.

Similar letters of reference indicate corresponding parts.

A and B are the two ends of the tire; C, the nuts welded to the tire, one to each end; D, the right and left screw; E, the blunt wedge-shaped ends of the fellies; F, the thimbles covering the same; G, the clip, covering the joint underneath; H, the bolts fastening the clip to the felly, and the tire being arranged in slotted holes in the clip, to shift along it as the joint tightens up. I is the notch in one end of the tire, and J the tongue on the other end, fitting in said notch to lock the two ends of the tire together laterally.

We are aware of the fact that a right and left screw has been used heretofore, with nuts attached to the tire for the purpose of adjusting the same; and we, therefore, confine our invention to the particular construction of devices acting in connection with said right and left screw. Among the particular advantages of our invention is the tongue and notch in the ends of the tire, whereby the ends are held true, and prevented from slipping to one side, and the wedge-shaped thimble-ended fellies fitting into corresponding depressions in the nut, whereby the ends of the felly are prevented from bursting out, and are always kept centered with the ends of the screw, so that in the operation of tightening the tire, as the nuts are drawn together the ends of the screw strike the thimble ends of the fellies and bending of the spokes prevented, the said wedge-shaped ends of the fellies and the recesses in the nuts making this joint the strongest of all in the wheel.

Having thus described our invention, what we claim as new, and desire to secure by Letters Patent, is—

The combination, with the right and left screw D, of a tire, having tongue J and notch I, the nuts C, rigidly attached to the ends of the tire, and the fellies, having wedge-shaped ends provided with metallic thimbles, which fit into corresponding recesses in the nuts, as shown and described.

HENRY A. R. HORTON.
AMOS P. HAYES.

Witnesses:
J. L. WHITE,
J. M. BRUGE.